(12) United States Patent
Camps

(10) Patent No.: US 12,336,882 B2
(45) Date of Patent: Jun. 24, 2025

(54) GINGIVA HEALING ABUTMENT FOR A DENTAL IMPLANT

(71) Applicant: CREADENT MONTAUBAN, Montauban (FR)

(72) Inventor: Jacques Camps, Negrepelisse (FR)

(73) Assignee: CREADENT MONTAUBAN, Montauban (FR)

( * ) Notice: Subject to any disclaimer, the term of this patent is extended or adjusted under 35 U.S.C. 154(b) by 0 days.

(21) Appl. No.: 17/769,302

(22) PCT Filed: Oct. 15, 2020

(86) PCT No.: PCT/EP2020/079073
§ 371 (c)(1),
(2) Date: Apr. 14, 2022

(87) PCT Pub. No.: WO2021/078628
PCT Pub. Date: Apr. 29, 2021

(65) Prior Publication Data
US 2024/0148477 A1 May 9, 2024

(30) Foreign Application Priority Data
Oct. 23, 2019 (FR) ..................................... 1911877

(51) Int. Cl.
*A61C 8/00* (2006.01)

(52) U.S. Cl.
CPC .......... *A61C 8/0066* (2013.01); *A61C 8/0018* (2013.01); *A61C 8/0059* (2013.01);
(Continued)

(58) Field of Classification Search
CPC ... A61C 8/0066; A61C 8/0018; A61C 8/0059; A61C 8/0068; A61C 8/008; A61C 2008/0084
(Continued)

(56) References Cited

U.S. PATENT DOCUMENTS

| 2005/0266381 A1* | 12/2005 | Abarno | A61C 1/084 433/173 |
| 2009/0246734 A1* | 10/2009 | Bar Shalom | A61C 8/005 433/215 |

(Continued)

FOREIGN PATENT DOCUMENTS

| KR | 2018136718 A | * | 12/2018 | ........... A61C 8/0001 |
| KR | 2019082725 A | * | 7/2019 | ........... A61C 8/0001 |

(Continued)

OTHER PUBLICATIONS

Search Report from the French Intellectual Property Office on corresponding FR application (FR1911877) dated Jul. 6, 2020.
(Continued)

*Primary Examiner* — Matthew M Nelson
(74) *Attorney, Agent, or Firm* — Alumen IP Law PC

(57) ABSTRACT

A healing abutment configured to be provided in an implant prior to fitting a prosthetic tooth and comprising a leg and a head which are aligned along an axis Z and connected by means of a tensioning screw, the leg comprising a lower leg portion configured to cooperate with the implant, the head comprising a lower head portion configured to cooperate with an upper portion of the leg, the healing abutment comprising a reference member which defines a reference point and is configured to cooperate with the leg in order to define a plurality of basic reference point positions and is movably mounted relative to an upper portion of the head having a predetermined shape in order to allow the selection of at least one optimum basic position from the plurality of basic positions.

20 Claims, 10 Drawing Sheets

(52) U.S. Cl.
CPC ............ *A61C 8/0068* (2013.01); *A61C 8/008* (2013.01); *A61C 2008/0084* (2013.01)

(58) Field of Classification Search
USPC .......................................................... 433/172
See application file for complete search history.

(56) References Cited

U.S. PATENT DOCUMENTS

| | | | | |
|---|---|---|---|---|
| 2011/0123948 | A1* | 5/2011 | Hinrichsen | A61C 8/005 433/173 |
| 2011/0318711 | A1* | 12/2011 | Wang | A61C 8/0068 433/213 |
| 2013/0196290 | A1* | 8/2013 | Herrington | A61C 8/0068 433/173 |
| 2013/0203015 | A1* | 8/2013 | Falco | A61C 8/008 433/173 |
| 2014/0205969 | A1* | 7/2014 | Marlin | A61C 13/0004 433/196 |
| 2014/0302457 | A1* | 10/2014 | Siegmund | A61C 13/20 433/173 |
| 2015/0004563 | A1* | 1/2015 | Blaisdell | A61C 8/0001 433/173 |
| 2018/0228578 | A1* | 8/2018 | Liston | A61C 13/34 |
| 2018/0325630 | A1* | 11/2018 | Leger | A61C 9/004 |
| 2018/0325631 | A1* | 11/2018 | Christiansen | A61C 8/0001 |
| 2019/0247154 | A1* | 8/2019 | Rallis | A61C 8/0093 |
| 2020/0015940 | A1* | 1/2020 | Fischler | A61C 8/0048 |
| 2020/0046468 | A1* | 2/2020 | Pappas | A61C 8/009 |
| 2020/0069398 | A1* | 3/2020 | Lowe | A61C 8/0089 |

FOREIGN PATENT DOCUMENTS

| | | | | |
|---|---|---|---|---|
| WO | WO-0185050 | A2 * | 11/2001 | A61C 8/005 |
| WO | WO-2009051367 | A1 * | 4/2009 | A61C 8/0006 |
| WO | WO-2013187597 | A1 * | 12/2013 | A61C 8/0001 |
| WO | WO-2017085288 | A1 * | 5/2017 | A61C 8/0001 |
| WO | WO-2019030525 | A2 * | 2/2019 | A61C 8/0001 |

OTHER PUBLICATIONS

International Search Report and Written Opinion on corresponding PCT application (PCT/EP2020/079073) from International Searching Authority (EPO) dated Nov. 29, 2020.

* cited by examiner

GINGIVA HEALING ABUTMENT FOR A DENTAL IMPLANT

TECHNICAL FIELD

The present invention relates to the field of dental implantology and is more particularly directed to an abutment for healing the gingiva around an implant for the placement of a prosthetic tooth.

In a known manner, a patient can have an implanting system placed in place of a missing tooth, namely an artificial tooth allowing him/her to regain normal mastication and an esthetic dentition.

In a known manner, an implanting system comprises an implant configured to be attached in the patient's maxillary bone, a prosthetic tooth similar in appearance to the exposed portion of the missing tooth, and a prosthetic abutment providing a connection between the implant and the prosthetic tooth.

In practice, the implant comprises a threaded outer cylindrical wall so as to be screwed into the patient's maxillary bone and a tap threaded inner cylindrical wall forming an implant housing. The prosthetic abutment, in turn, comprises a threaded shank configured to be screwed into the implant housing. In other words, the threaded shank and the tap threaded inner cylindrical wall threadedly cooperate to mount the prosthetic abutment in the implant. The prosthetic tooth, in turn, is screwed or cemented to the prosthetic abutment, using or not a clamping screw.

In a known manner, the implanting system is placed in several steps. In the first step, drilling is performed in the gingiva and in the maxillary bone at the missing tooth, where the implant is inserted. In the second step, impressions are taken of the patient's mouth in order to make a prosthetic tooth that is adapted in shape and size to the missing tooth. The prosthetic abutment and the prosthetic tooth are then placed in the third step.

The time between the placement of the implant and impression taking is approximately three to six months, depending on the patient, in order to allow the healing of the gingiva around the implant and the immobilization of the implant within the maxillary bone, known to the skilled person as "osseointegration".

In practice, when the implant is placed, a healing screw is inserted into the implant housing. The healing screw comprises a threaded shank similar to that of the prosthetic abutment, which prevents food residue from being deposited in the implant housing and prevents the gingiva from covering the thread of the tap threaded inner cylindrical wall of the screw, and a flat head mounted onto the threaded shank, which promotes healing of the gingiva around the implant. In some cases, for example when the patient is a smoker or following a bone graft, a cover screw is inserted to promote osseointegration, which is replaced by the healing screw later. A temporary prosthetic tooth may be mounted onto the cover screw and the healing screw for esthetic purposes.

When taking impressions, whether physically or optically, the healing screw has to be removed in order to precisely measure the available space left by the missing tooth and the position of the implant in that available space. In the case of physical impression taking, a mold of the patient's mouth is made. In the case of optical impression taking, a transfer is inserted into the implant housing and a scanner measures the available space and the relative position of the transfer in the available space, giving access to the implant position. The healing screw is then reinserted and removed to place the prosthetic abutment and the prosthetic tooth.

All these manipulations of the healing screw are time-consuming, unpleasant for the patient and increase the risk of inflammation of the gingivae and maxillary bone at the implant, known to the skilled person as "peri-implantitis". Peri-implantitis results in retraction of the gingiva at the implant, which may leave a part of the implant exposed, which is painful for the patient, unsightly and may require further surgery.

In addition, the drawback of the healing screw is that the gingiva heals in an unnatural circular gingival contour, so that the emergence profile of the prosthetic tooth once placed is unnatural and therefore unattractive. In other words, the interface between the prosthetic tooth and the healed gingiva does not have a harmonious concave profile. Furthermore, food is likely to become lodged at the interface between the prosthetic tooth and the gingiva, which may lead to infection or other discomfort.

To overcome these drawbacks, it is known in prior art to replace the healing screw with a healing abutment comprising a head comprising a head housing into which a clamping screw connecting the head to the implant is inserted. This head has a conical shape chosen to allow healing of the gingiva in a gingival contour adapted to the prosthetic tooth that will be placed. Besides, this healing abutment is available in four different shapes referenced by a color, depending on whether the missing tooth is an incisor, a canine, a premolar or a molar. When optically taking impressions, this healing abutment replaces the transfer and therefore does not need to be removed.

Another healing abutment is also known from patent application WO2014158534A1, comprising a foot configured to be inserted into the implant housing and a head with a diameter similar to the prosthetic tooth allowing healing of the gingiva in an adapted gingival contour. The foot and the head respectively comprise a foot through cavity and a head through cavity in the extension of the implant housing, into which a clamping screw is inserted to connect the implant, the foot and the head and thus form the healing abutment. In addition, the head has upper notches whose arrangement and shape indicate the size of the head and its position relative to the implant. Sixteen different notch combinations are suggested. When optically taking impressions, this healing abutment thus replaces the transfer.

In prior art, patent application WO2017085288A1 also teaches a healing abutment whose head has an upper surface that allows it to replace the transfer when taking impressions, by virtue of an asymmetrical shape with an edge that defines an oriented reference frame.

However, these two healing abutments have two noticeable drawbacks. On the one hand, their angular position relative to the implant axis is not precisely determined, with the result that the prosthetic tooth does not perfectly adapt to the available space and the implant. This makes it difficult to mount the prosthetic tooth, particularly in the case of drilling into the gingiva off-center from the available space, in which case the prosthetic tooth has a cantilevered profile, which is unsightly and can lead to food becoming lodged at the interface between the prosthetic tooth and the gingiva, as previously explained.

On the other hand, in order to perform the optical impression transfer and thus determine the shape of the final tooth, it is necessary to use a business software capable of reading the color code or healing abutment notches. This has many drawbacks, as professionals need to be equipped with specific business software, that is, where the information corresponding to each color or notch has been implemented, as well as a wide range of healing abutments.

The present invention intends to eliminate at least some of the drawbacks mentioned.

BACKGROUND

The invention relates to a healing abutment configured to be mounted in an implant prior to placing a prosthetic tooth, the healing abutment comprising a foot and a head that are aligned along an axis Z and connected by a clamping screw extending along the axis Z, the foot comprising a lower foot part configured to cooperate with the implant and an upper foot part, the head comprising a lower head part configured to cooperate with the upper foot part so as to mount the head onto the foot, and an upper head part having a predetermined shape.

The invention is remarkable in that the healing abutment comprises at least one reference member defining a reference frame oriented in at least two dimensions and configured to cooperate with the foot in order to define a plurality of elemental positions of the reference frame oriented with respect to said foot along the axis Z, said reference member being movably mounted with respect to the upper head part in order to allow the selection of at least one optimal elemental position among the plurality of elemental positions according to the determined shape of said upper head part.

Advantageously, the healing abutment does not need to be removed or manipulated during impression taking to define the shape and size of the prosthetic tooth. Indeed the prosthetic tooth can be defined by virtue of the reference member, which is mounted onto the upper head part and is therefore visible without any manipulation. This reduces the risk of peri-implantitis and makes impression taking less time consuming and more pleasant for the patient.

Preferably, the reference member defines a reference frame in three dimensions, so as to precisely define the shape and size of the prosthetic tooth.

According to one aspect of the invention, the reference member is mounted as an insert onto the upper head part. Advantageously, a standard reference member can be mounted onto a head of any size and shape. In other words, if the head has a size and shape adapted to the missing tooth, such as an incisor or a canine, the reference member is universal, thus saving material and cost.

According to one aspect of the invention, the reference member comprises at least one neck comprising at least one protruding portion extending radially relative to the axis Z, so as to define the reference frame. Advantageously, the protruding portion extends along an angular direction forming one of the axes of the reference frame. Thus the reference frame is defined in a simple manner and is easily readable by any physical or optical impression taking member.

Preferably, the protruding portion comprises a protruding radial length greater than 2 mm, preferably greater than or equal to 3 mm. Preferably, the radial protruding length is less than 5 mm, in order to prevent the protruding portion from extending protruding from the upper head part, which would cause discomfort to the patient.

According to a preferred aspect, the protruding portion is in the form of at least one reference finger extending radially relative to the axis Z. Advantageously, a reference finger allows an angular direction forming one of the axes of the reference frame, to be precisely defined. Preferably, the protruding portion is in the form of at least two reference fingers, preferably three reference fingers, so as to more precisely define the reference frame, so as to manufacture a prosthetic tooth that adapts perfectly to the patient's mouth. A small measurement uncertainty at the scale of a tooth may indeed lead to manufacturing a tooth that does not insert into the patient's mouth.

According to one aspect of the invention, the reference member comprises at least one neck comprising at least one reduced portion extending radially relative to the axis Z and comprising a reduced radial length of less than 3 mm, preferably less than or equal to 2 mm. Preferably, the reduced radial length is greater than 0.5 mm. In practice, the implant is often not mounted in the center of the cavity formed by the missing tooth, so that the head of the manufacturing system is mounted off-center relative to the axis Z. The reduced portion can thus advantageously be angularly positioned so that it does not protrude radially from the head. Such a reduced portion thus increases the comfort of the patient and facilitates its mounting.

Preferably, the reduced portion extends over an angular range about the axis Z greater than 90°. Preferably the angular range is greater than 150°, more preferably greater than 180°.

Preferably, the neck of the reference member extends in a plane transverse to the axis Z.

According to one aspect of the invention, the reference member comprises a reference through cavity of axis Z within which the clamping screw extends. Advantageously, the reference member is mounted integral with the healing abutment and does not need to be mounted and then removed during impression taking.

According to another aspect of the invention, the upper foot part comprises at least one first interlocking member, the lower head part comprises at least one second interlocking member configured to cooperate with the first interlocking member so as to mount the head onto the foot, the first interlocking member comprises at least eight radial teeth relative to the axis Z and the second interlocking member comprises at least eight radial notches configured to cooperate with the radial teeth in order to define a plurality of elemental positions between the foot and the head relative to the axis Z.

Advantageously, the angular positioning of the healing abutment relative to the implant is precise and fine, allowing for easier placement of the healing abutment and a better esthetic and functional result for the patient.

Preferably, the first interlocking member comprises at least twelve radial teeth, preferably at least eighteen radial teeth, preferably at least twenty-four radial teeth, for fine and precise angular positioning of the healing abutment relative to the implant.

Preferably, the second interlocking member comprises at least twelve radial notches, preferably at least eighteen radial notches, preferably at least twenty-four radial notches, for fine and precise angular positioning of the healing abutment relative to the implant.

According to one aspect, the head comprises a head through cavity of axis Z within which the clamping screw extends. Such a head thus has a dual function as a temporary prosthetic tooth. No temporary prosthetic tooth is therefore mounted onto the healing abutment as an insert. This gives the healing abutment a smaller overall size, makes it less expensive and easier to handle.

According to one aspect, the head forms a prosthetic healing tooth configured to have substantially the shape and size of the prosthetic tooth to be placed, for an esthetic and functional result for the patient during the entire healing period.

According to another aspect of the invention, the foot comprises at least one third interlocking member and the reference member comprises an annular body of axis Z comprising at least one fourth interlocking member configured to cooperate with the third interlocking member in order to define a plurality of elemental positions between the foot and the reference member relative to the axis Z. Such a reference member occupies a small volume and its angular positioning relative to the foot, and thus to the implant, is precise and fine. The determination of the shape and size of the prosthetic tooth during impression transfer is thus precise.

According to one aspect, the third interlocking member comprises at least three axial teeth relative to the axis Z. Preferably, the fourth interlocking member comprises at least three axial notches configured to cooperate with the axial teeth in order to define a plurality of elemental positions between the foot and the reference member relative to the axis Z.

Preferably, the third interlocking member comprises three axial teeth relative to the axis Z. Preferably, the fourth interlocking member comprises three axial notches. Advantageously, the positioning of the reference member and more precisely of one of its reference fingers is facilitated.

The invention also relates to an assembly of an implant and a healing abutment as previously disclosed, the implant comprising an attachment end configured to be attached to a patient's maxillary bone and a gingival end configured to extend into the patient's gingiva and comprising an implant housing comprising a female thread, the lower foot part of the healing abutment being mounted in the implant housing and the clamping screw of the healing abutment cooperating with the female thread of the implant housing.

BRIEF DESCRIPTION OF THE DRAWINGS

The invention will be better understood upon reading the following description, which is given only by way of example, and referring to the appended drawings given as non-limiting examples, in which identical references are given to similar objects and in which.

It should be noted that the figures disclose the invention in detail for implementing the invention, said figures may of course be used to better define the invention if necessary.

DETAILED DESCRIPTION

In a known manner, an implanting system comprises an implant configured to be attached in a patient's maxillary bone in place of a missing tooth, a prosthetic tooth similar in appearance to the exposed portion of the missing tooth, and a prosthetic abutment providing a connection between the implant and the prosthetic tooth.

In a known manner, an implant comprises an attachment end configured to be attached to the patient's maxillary bone and a gingival end configured to extend into the patient's gingiva and comprising an implant housing, configured to cooperate with the prosthetic abutment. More specifically, the attachment end comprises an outer thread so as to be threaded into the patient's maxillary bone. The gingival end, in turn, comprises an implant housing comprising an inner female thread.

A healing abutment according to the invention configured to be mounted in an implant, prior to placing the prosthetic tooth and the prosthetic abutment, is hereinafter described.

Figure 1:
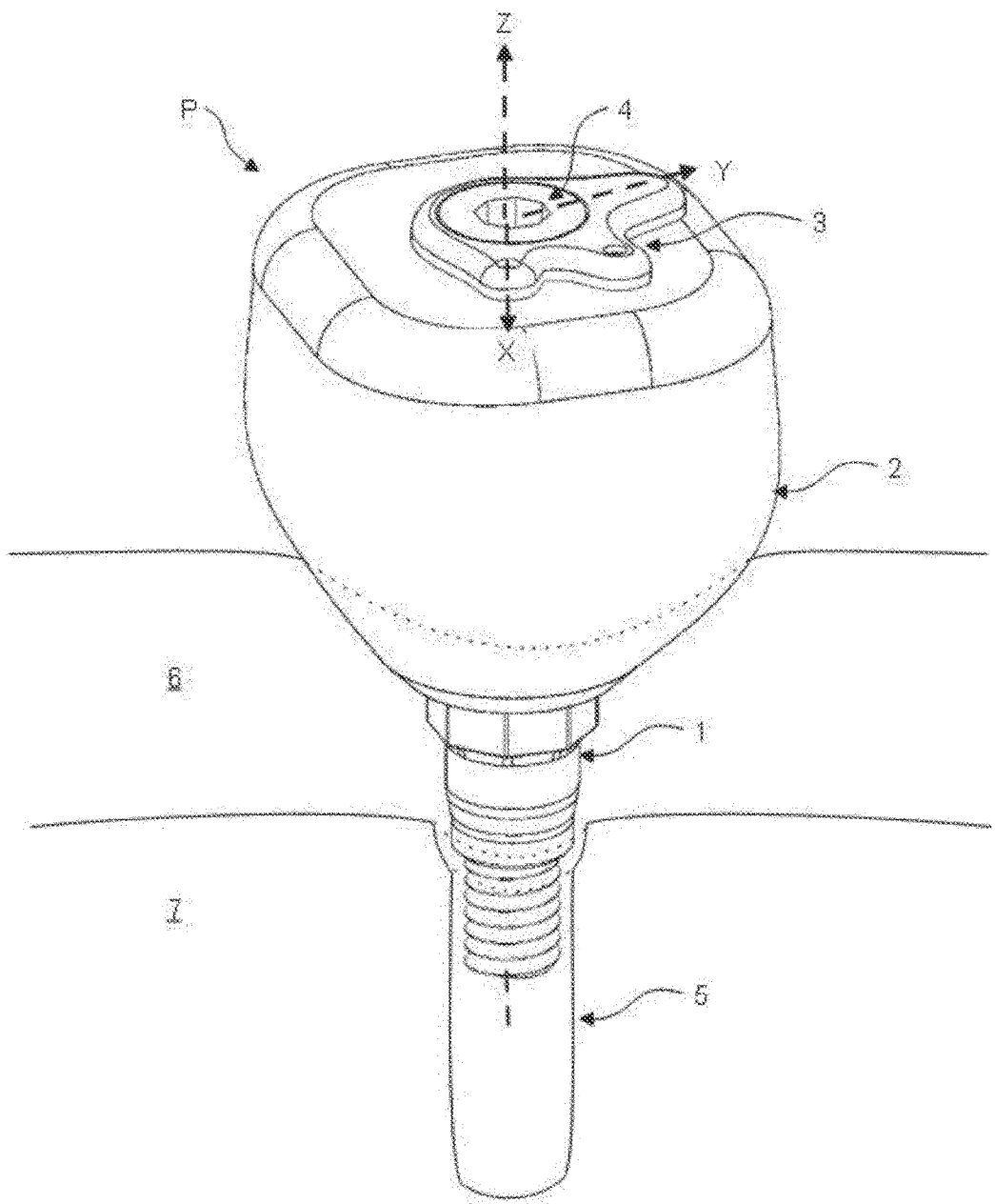
FIG. 1 is a schematic perspective representation of the healing abutment according to the invention.

According to the invention, with reference to FIG. 1, the healing abutment P comprises a foot 1 and a head 2 that are aligned along a vertical axis Z and connected by a clamping screw 4 extending along an axis Z. More specifically, the foot 1 comprises a lower foot part configured to cooperate with the implant 5 and an upper foot part configured to cooperate with the head 2. In turn, the head 2 comprises a lower head part configured to cooperate with the upper foot part so as to mount the head 2 onto the foot 1 and an upper head part having a determined shape.

According to the invention, still with reference to FIG. 1, the healing abutment P further comprises a reference member 3 defining an oriented reference frame X, Y, Z with several dimensions. The reference member 3 is on the one hand configured to cooperate with the foot 1 in order to define a plurality of elemental positions of the oriented reference frame X, Y, Z with respect to the foot 1 along the axis Z and on the other hand mounted onto the upper head part in order to allow the selection of at least one optimal elemental position among the plurality of elemental positions according to the determined shape of the upper head part. Such a healing abutment P according to the invention thus has the advantage that it does not have to be removed or manipulated during impression taking to define the shape and size of the prosthetic tooth, whether impression taking is physical or optical. Indeed the prosthetic tooth is defined solely from the reference member 3, which is visible without any manipulation, thus saving time and comfort for the patient and besides reducing the risk of peri-implantitis.

The structural and functional aspects of the foot 1, the head 2, the reference member 3 and the clamping screw 4 will be successively described hereinafter. It should be noted that throughout this patent application, the terms "inner" and "outer" are defined radially relative to the axis Z and the terms "lower" and "upper" are defined relative to the vertical axis Z, oriented from the foot 1 to the head 2.

Figure 2A:
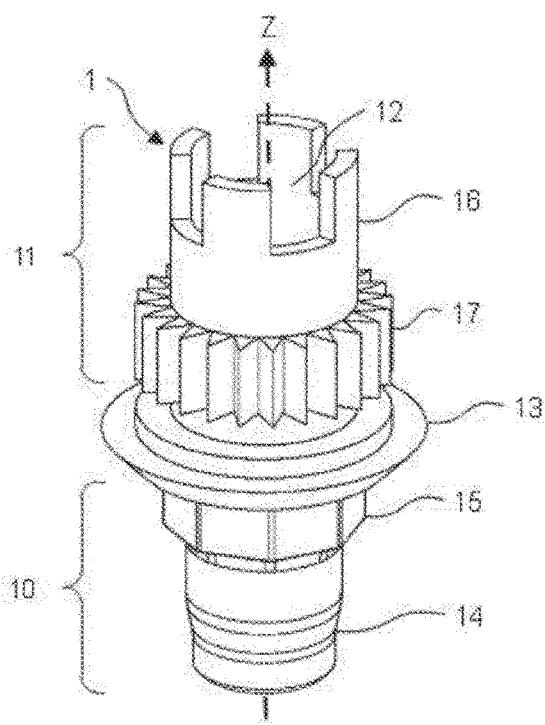
FIG. 2A.
Figure 2B:
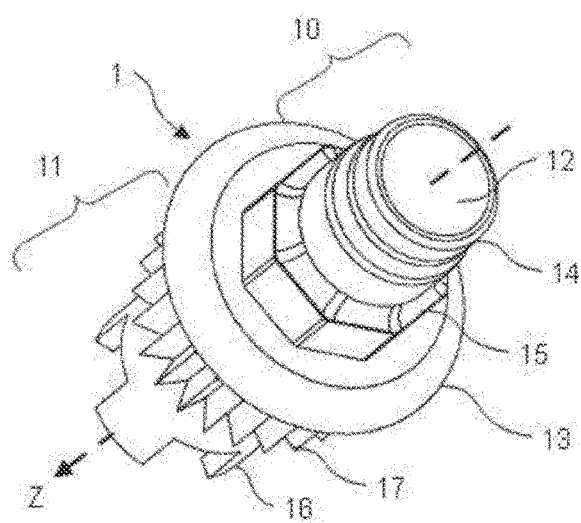
FIG. 2B are schematic perspective representations of the foot of the healing abutment according to the invention.

With reference to FIGS. 2A and 2B, the foot 1 extends along the axis Z and comprises a lower foot part 10, an upper foot part 11, and a foot cavity 12 vertically going through the lower foot part 10 and the upper foot part 11 for the clamping screw 4 to pass therethrough. In the example shown in FIGS. 2A and 2B, the lower foot part 10 and upper foot part 11 are separated by a crown 13 of axis Z. The crown 13 extends radially protruding relative to the axis Z so as to serve as an axial support for the head 2, that is, as a stop, and to allow its proper axial positioning along the axis Z. Although this crown 13 has the advantage of having a small overall size, it goes without saying that it could be replaced by any support element or even that the lower foot part 10 and the upper foot part 11 could be in direct contact. In this example, the crown 13 comprises a planar upper surface to cooperate with the head 2 in a stable manner. Preferably, the crown 13 comprises a frustoconical lower surface, increasing from the bottom to the top along the axis Z, so as to adapt to the shape of the gingiva.

Preferably, as illustrated in FIGS. 2A and 2B, the lower foot part 10 comprises a foot shank 14 having a surface of revolution of axis Z that is threaded, as well as a connecting ring 15 mounted above the foot shank 14 relative to the axis Z, polygonal in shape, defining eight faces in this example. By virtue of the foot shank 14 and the connecting ring 15, the lower foot part 10 is configured to provide a connection between the healing abutment P and the implant 5. More specifically, the foot shank 14 is configured to cooperate with the thread of the implant housing so as to screw the foot 1 onto the implant 5 while the connecting ring 15 is configured to cooperate with a polygonal outer wall of the implant housing so as to prevent unscrewing of the foot 1 from the implant 5, known to the skilled person as an "anti-rotation system". In the example of FIGS. 2A and 2B, the connecting ring 15 comprises eight faces, but it goes without saying that the number of faces could be different. Besides, it goes without saying that the connecting ring 15 could be any anti-rotation system, or even that there could be no anti-rotation system.

The upper foot part 11 comprises in turn a first interlocking member 17 comprising a plurality of radial teeth relative to the axis Z configured to cooperate with a second interlocking member of the head 2, being in the form of radial notches. Advantageously, the first interlocking member 17 and the second interlocking member allow the angular adjustment of the mounting of the head 2 onto the foot 1. In other words, the head 2 can be mounted in different possible elemental positions onto the base 1. Such interlocking members 17 furthermore act as an anti-rotation system, preventing any possible rotational movement between the foot 1 and the head 2 once mounted. In the example of FIGS. 2A and 2B, the number of radial teeth is twenty-four, providing fine angular adjustment. Advantageously, the head 2 can be positioned in twenty-four different elemental positions and thus adapt precisely to the available space left by the missing tooth in the patient's mouth. It goes without saying that the number of radial teeth could be smaller, in which case the fineness of the angular adjustment would be smaller, within the lower limit of eight radial teeth. The number of radial teeth could also be higher, however the gain would be hardly noticeable and would superfluously increase the complexity of the first interlocking member 17. Furthermore, in the example of FIGS. 2A and 2B, the radial teeth are in the form of triangular prisms of axis Z, allowing easy mounting of the head 2 onto the foot 1, but it goes without saying that the radial teeth could take a different shape, such as a cylindrical shape with a rectangular base.

Figure 2C:
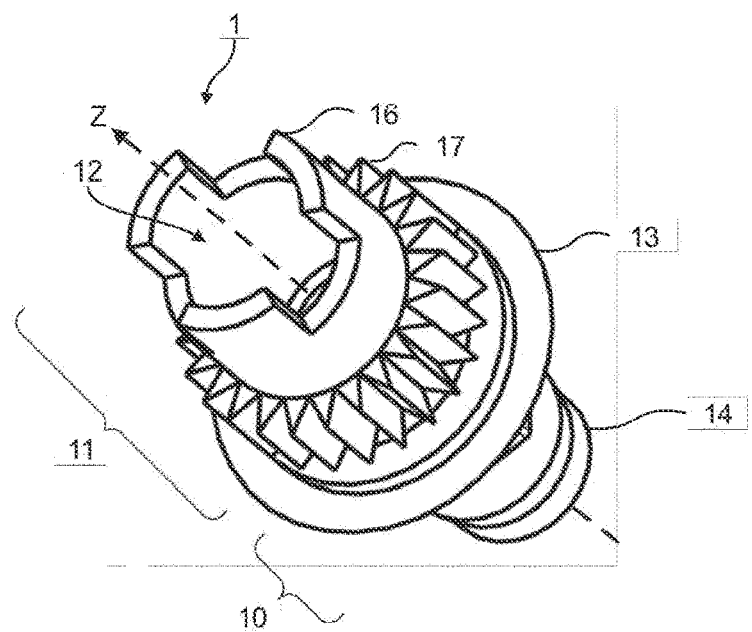
FIG. 2C is a schematic perspective representation of the foot of the healing abutment according to an alternative embodiment of the invention.

Preferably, still with reference to FIGS. 2A and 2B, the upper head part 11 further comprises a third interlocking member 16 mounted above the first interlocking member 17 along the axis Z and comprising axial teeth of axis Z so as to be able to mount the reference member 3 onto the foot 1. The third interlocking member 16 also acts as an anti-rotation system, preventing a possible rotational movement between the reference member 3 and the foot 1. In the example of FIGS. 2A and 2B, the number of axial teeth is four, providing four possible elemental positions for the reference member 3. It goes without saying that the number of axial teeth could be different, preferably equal to three, to facilitate the positioning of the reference member 3, as illustrated in FIG. 2C. Besides, in the example of FIGS. 2A and 2B, the axial teeth are in the form of cylinders with a rectangular base of axis Z, allowing easy mounting of the head 2 onto the foot 1, but it goes without saying that the axial teeth could take a different shape.

Thus, the foot 1 allows precise angular orientations to be defined with respect to the implant 5, the head 2 and the reference member 3.

The head 2 is described hereinafter with reference to FIGS. 3A and 3B. As illustrated in these two figures, the head 2 has a peripheral shape Z and comprises a lower head part 20, an upper head part 21 and a head cavity 23 going through the lower head part 20 and the upper head part 21 for the clamping screw 4 to pass therethrough.

Figure 3A:
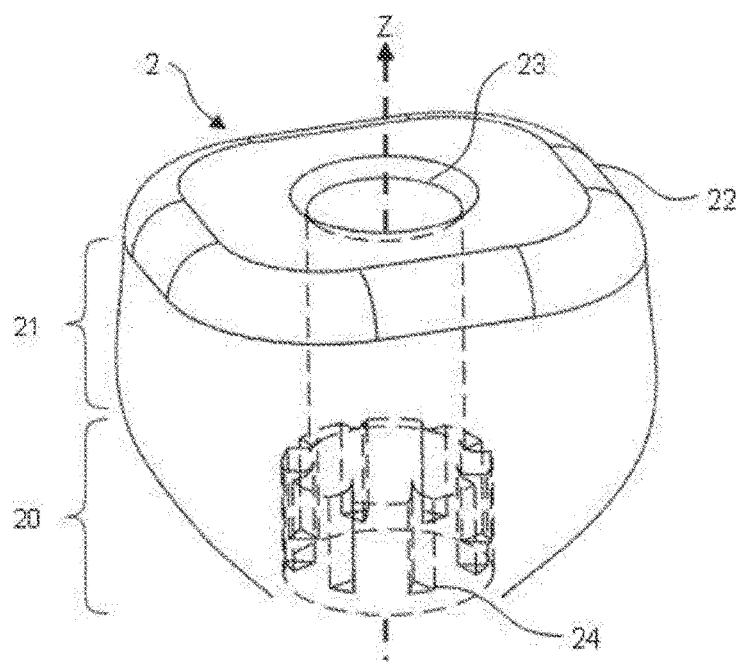
FIG. 3A.
Figure 3B:
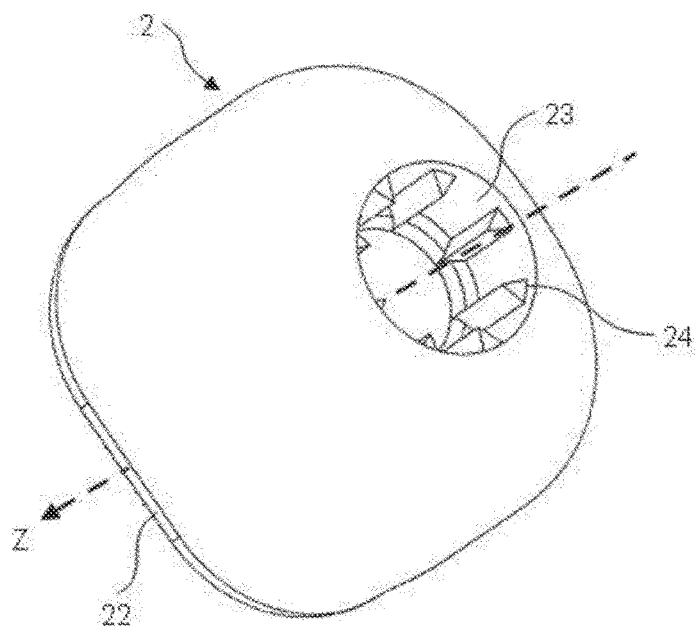
FIG. 3B are schematic perspective representations of the head of the healing abutment according to the invention.

Preferably, as illustrated in FIGS. 3A and 3B, the lower head part 20 comprises a conical outer wall configured to promote gingival healing along a concave profile around the conical outer wall, so that once the prosthetic tooth is placed, the interface between the prosthetic tooth and the gingiva is natural and esthetic. The conicity of the outer wall of the lower head part 20 depends on the missing tooth to be replaced, depending on whether it is an incisor, canine, premolar or molar as examples. Preferably, the outer wall is in continuity with the crown 13 of the foot 1.

According to one preferred aspect of the invention, the head 2 forms a healing prosthetic tooth configured to have substantially the shape of the prosthetic tooth to be placed. Thus, the addition of a temporary prosthetic tooth is not necessary since the head 2 provides this function in addition to the gingiva healing function. Further, preferably, the upper head part 21 comprises a rounded peripheral edge 22 for esthetic purposes and to prevent the edge from being sharp and potentially injuring the patient's mouth.

As previously described, as illustrated in FIGS. 3A and 3B, the lower head part 20 comprises a second interlocking member 24 comprising a plurality of radial notches. Such second interlocking member 24 is configured to cooperate with the first interlocking member 17 of the foot 1, so as to mount the head 2 onto the foot 1 and prevent relative rotational movement between said head 2 and said foot 1. Preferably, the number of radial notches of the second interlocking member 24 is equal to that of the first interlocking member 17, for easy mounting. Preferably also, the shape of the radial notches is complementary to the shape of the radial teeth of the first interlocking member 17, for easy assembly. However, it goes without saying that the number of radial notches of the second interlocking member 24 as well as their shape may not be complementary to the radial teeth of the first interlocking member 17.

The head 2 may thus be ergonomically positioned onto the foot 1.

The reference member 3 is described hereinafter with reference to FIGS. 4A, 4B and 4C. As illustrated in the figures, the reference member 3 comprises a peripheral body 30 of axis Z, a neck 31 mounted onto the body 30, and a reference cavity 32 of axis Z going through the body 30 and the neck 31 for the clamping screw 4 to pass therethrough. The body 30 is configured to cooperate with the upper foot part 11. The neck 31, in turn, is configured to be mounted onto the upper head part 21 and define the reference frame X, Y, Z. The neck 31 extends in a plane transverse to the axis Z.

Advantageously, the cooperation of the body 30 and the upper foot part 11 makes it possible to interconnect the angular positioning of the foot 1 to that of the reference member 3 and in particular to that of the neck 31, which is the visible part of the reference member 3 once the healing abutment P is mounted. Thus, the orientation of the reference frame X, Y, Z defined by the collar 31 is that of the foot 1, which avoids having to dismantle the healing abutment P during impression taking. The mounting of the collar 31 onto the head upper part 21 further allows the angular position of the head 2 to be defined in the oriented reference frame X, Y, Z. The reference member 3 and the head 2 allow the final prosthetic tooth to be fully determined in cooperation. The reference cavity 32 also secures the reference member 3 to the healing abutment P.

Figure 4A:
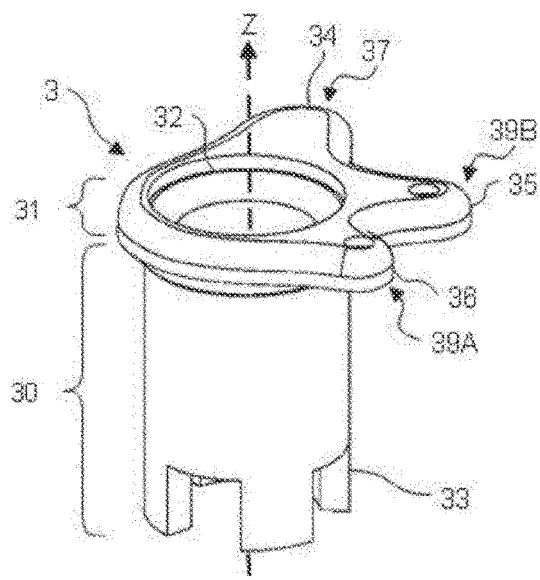
FIG. 4A.
Figure 4B:
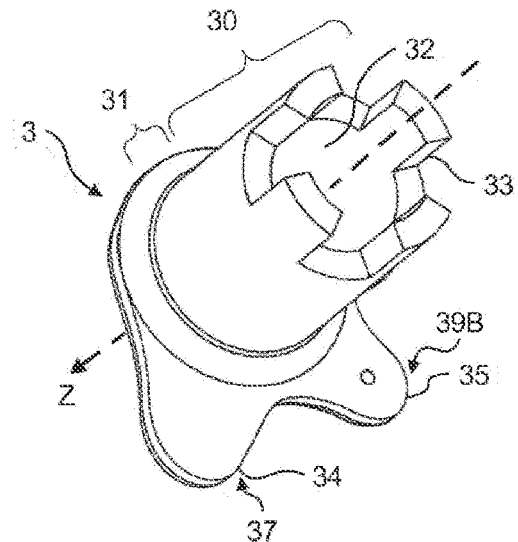
FIG. 4B are schematic perspective representations of the reference member of the healing abutment according to the invention.

As illustrated in FIGS. 4A and 4B, the body 30 is cylindrical with a circular cross-section and has a diameter smaller than that of the head cavity 23 so that it can be inserted into said head cavity 23. Furthermore, the body 30 comprises a fourth interlocking member 33 configured to cooperate with the third interlocking member 16 of the foot 1, so as to mount the reference member 3 onto the foot 1 and to prevent any relative rotational movement between said reference member 3 and said foot 1. Preferably, the fourth interlocking member 33 comprises axial notches. The number of axial notches in the fourth interlocking member 33 is equal to the number of axial teeth in the third interlocking member 16, for easy mounting. In the example of FIG. 4B, the fourth interlocking member 33 thus comprises four axial notches to cooperate with the fourth interlocking member 16 of FIG. 2B. In the example of FIG. 4E, the fourth interlocking member 33 comprises, in turn, three axial notches to cooperate with the fourth interlocking member 16 of FIG. 2C. Preferably also, the shape of the axial notches is complementary to the axial teeth of the third interlocking member 16, for easy mounting. However, it goes without saying that the number of axial notches in the fourth interlocking member 33, as well as their shape, may not be complementary to the axial teeth of the third interlocking member 16.

Figure 4C:
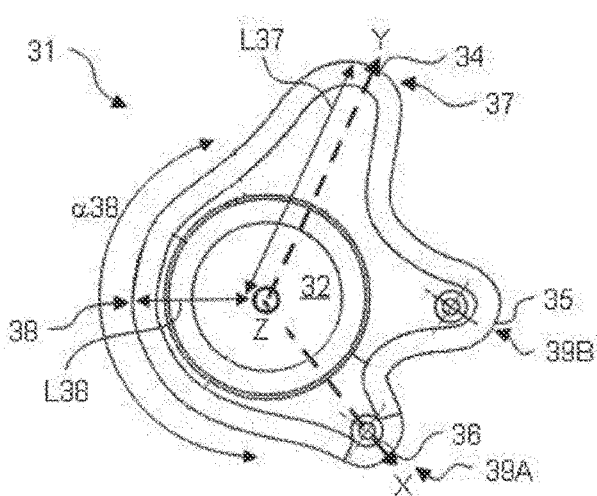
FIG. 4C is a schematic transverse cross section representation of the neck of the reference member according to the invention.

As illustrated in FIG. 4C, the neck 31 comprises a protruding portion 37 extending radially relative to the axis Z and having a radial direction that defines one of the directions of the reference frame X, Y, Z. Preferably, the protruding portion 37 extends over a radial protruding length L37 greater than 2 mm, preferably greater than or equal to 3 mm so as to indirectly indicate an orientation of the foot 1. The radial protruding length L37 is less than 5 mm, so as to limit overall size.

Such a protruding radial length L37 also prevents the protruding portion 37 from extending protruding from the head 2, which would cause discomfort to the patient and complicate the mounting of the manufacturing abutment P. In the example shown in FIG. 4C, the protruding portion 37 is axially aligned with one of the axial notches of the fourth interlocking member 33 for simplicity in defining the reference frame X, Y, Z, but it goes without saying that this may not be the case.

In the example shown in FIG. 4C, the neck 31 comprises three protruding portions 37, 39A, 39B each aligned with an axial notch of the fourth interlocking member 33. In practice, only one protruding portion 37 is sufficient to define the reference frame X, Y, Z, but the other protruding portions 39A, 39B allow the reference frame X, Y, Z to be defined more finely, so that the prosthetic tooth can be determined as precisely as possible. It goes without saying that the number of protruding portions is arbitrary, although more than 3 would unnecessarily increase the overall size. In this example, each of the protruding portions 37, 39A, 39B also has a different radial protruding length L37 in order to be able to simply distinguish the protruding portion 37 from the others. However, it goes without saying that the protruding portions 37, 39A, 39B could comprise the same radial protruding length L37.

More specifically, the protruding portions 37, 39A, 39B of the neck 31 are in the form of reference fingers 34, 35, 36, preferably rounded at their ends so as not to disturb the patient when touching them. Such a shape advantageously makes it possible to simply define a radial direction, however it goes without saying that the protruding portions 37, 39A, 39B could have any different shape. In particular, the neck 31 could have a polygonal cross-section whose vertices form the protruding portions 37, 39A, 39B. The number of vertices could be equal to the number of axial notches in the fourth interlocking member 33. The protruding portions 37, 39A, 39B could also have a different shape from each other to distinguish them.

Figure 4D:
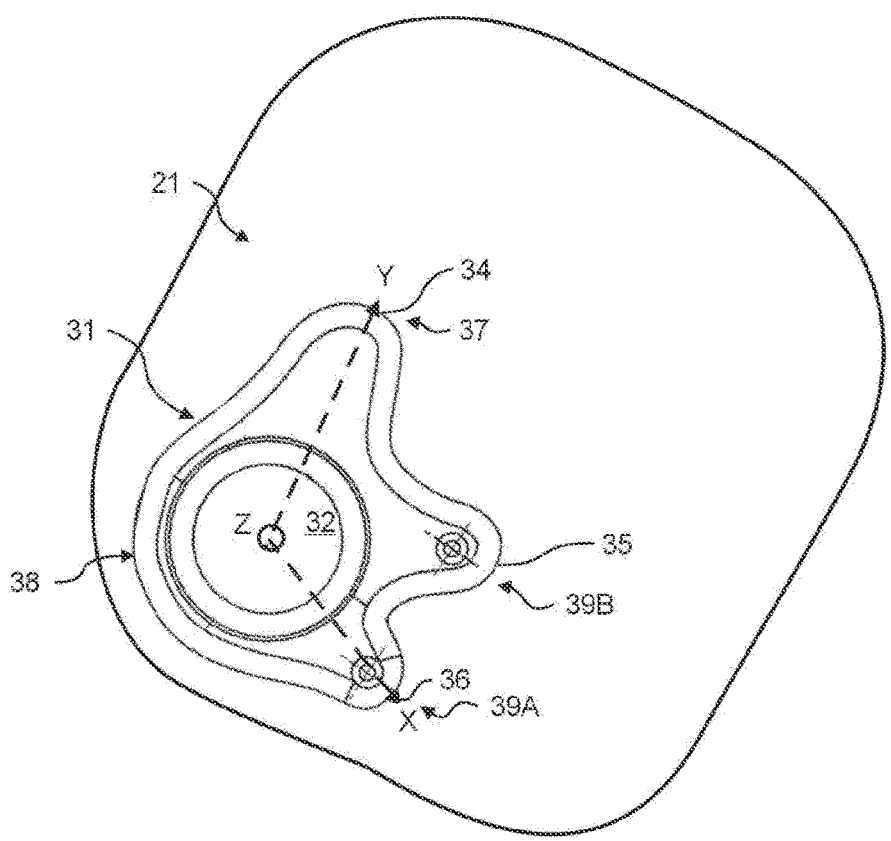
FIG. 4D is a schematic transverse cross section representation of the neck of the reference member mounted off-center relative to the axis Z according to an alternative embodiment of the invention.
Figure 4E:
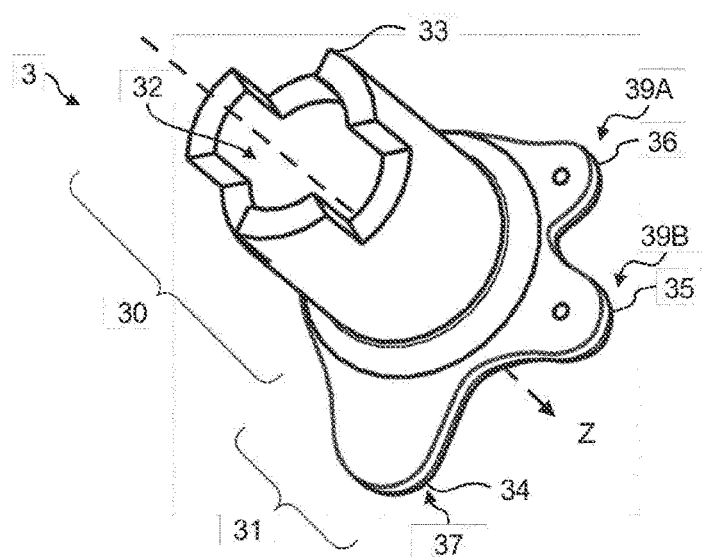
FIG. 4E is a schematic perspective representation of the reference member of the healing abutment according to an alternative embodiment of the invention.

In the example of FIG. 4C, the neck 31 further comprises a reduced portion 38 extending radially relative to the axis Z. The reduced portion 38 is advantageously configured to reduce the overall size of the reference member 3 over a given angular range. In practice, as illustrated in FIG. 4D, the implant may indeed not be positioned in the center of the space left by the missing tooth. In this case, the head 2 extends off-center relative to the axis Z, that is, the head cavity 23 is off-center with respect to the head 2. The reference member 3 may in this case be angularly mounted so that the reduced portion 38 is advantageously located where the radial distance separating the head cavity 32 from the outer walls of the upper head part 21 is smallest.

By virtue of the reduced portion 38, the reference member 3 does not extend protruding from the head 2, even if the head 2 is off-center relative to the axis Z. Preferably, as illustrated in FIGS. 4C and 4D, the reduced portion 38 comprises a reduced radial length L38 of less than 3 mm, preferably less than or equal to 2 mm, in order to be effective even in the case of a pronounced off-centering. Preferably, the reduced radial length L38 is greater than 0.5 mm. Preferably also, the reduced portion 38 extends over an angular range $\alpha 38$ about the axis Z greater than 90°, preferably greater than 150°, more preferably greater than 180°, in order to be effective even in the case of a pronounced off-centering.

Figure 5:
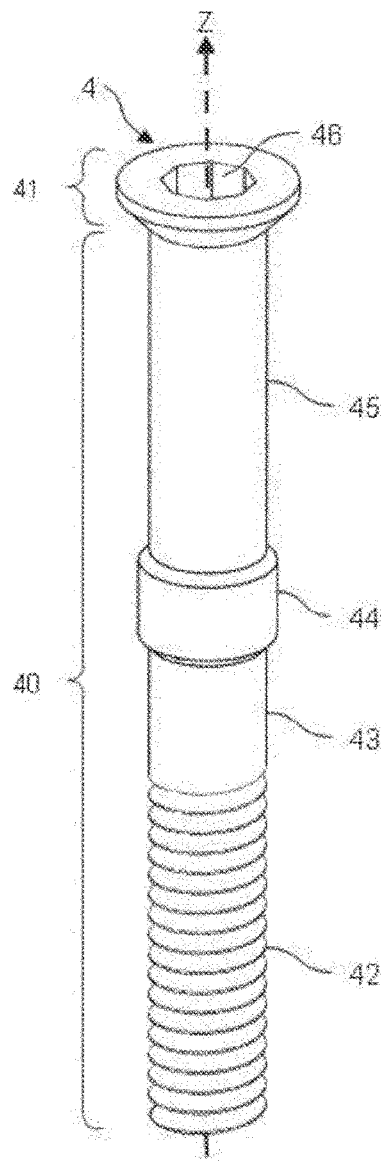
FIG. 5 is a schematic perspective representation of the clamping screw of the healing abutment according to the invention.

The clamping screw 4 will be described hereinafter with reference to FIG. 5. With reference to FIG. 5, the clamping screw comprises a shank 40 of axis Z and a screw head 41 mounted onto the shank 40. The shank 40 has a diameter configured to be smaller than that of the foot cavity 12, the head cavity 23, the reference cavity 32 and the implant housing. Thus, the shank 40 is configured to be inserted into the foot cavity 12, the head cavity 23, the reference cavity 32, and the implant housing, so as to mount the healing abutment P onto the implant.

Preferably, as illustrated in FIG. 5, the shank 40 comprises a threaded first shank part 42 configured to be screwed into the implant housing, a second shank part 43 configured to extend into the lower head part 10, a third shank part 44 larger in diameter than the inner diameter of the crown 13 of the foot 1 and configured to extend into the upper head part 11, and a fourth shank part 45 configured to extend into the head cavity 23 and into the reference cavity 32. However, it goes without saying that the shank 40 could comprise only a single shank part of any kind or a selection of the aforementioned parts.

Preferably, as illustrated in FIG. 5, the screw head 41 is flat so as to limit the overall size of the reference member 3 and comprises a head recess 46 configured to receive a tool, such as a screwdriver, so as to screw the clamping screw 4 into the implant housing and clamp the assembly.

Figure 6A:
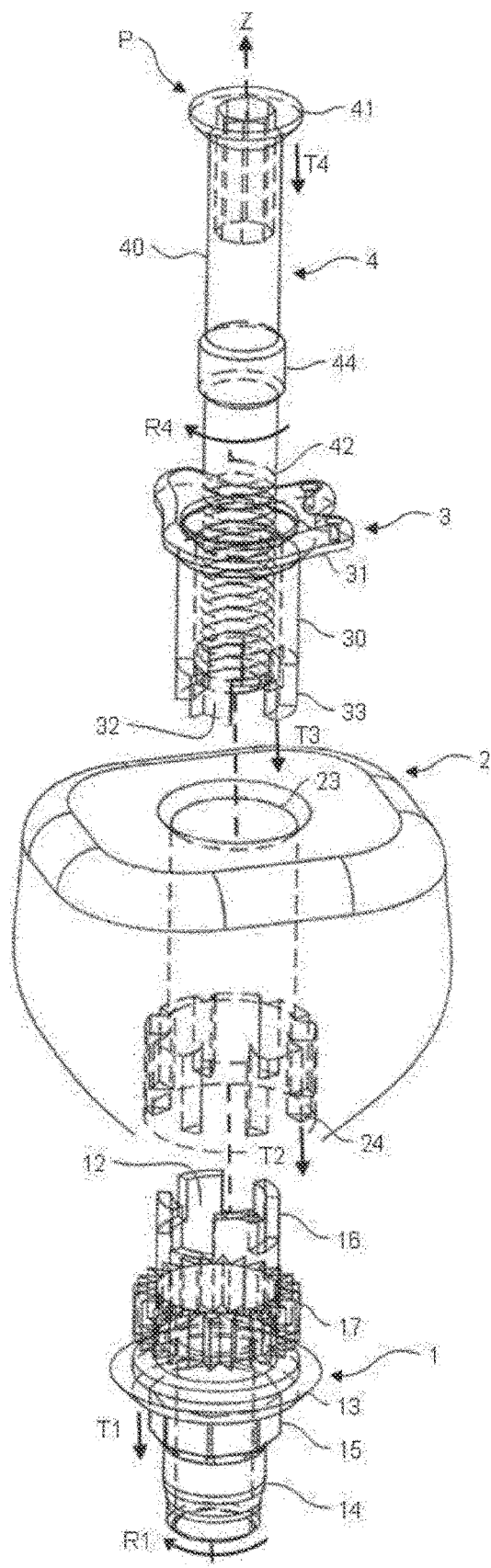
FIG. 6A.
Figure 6B:
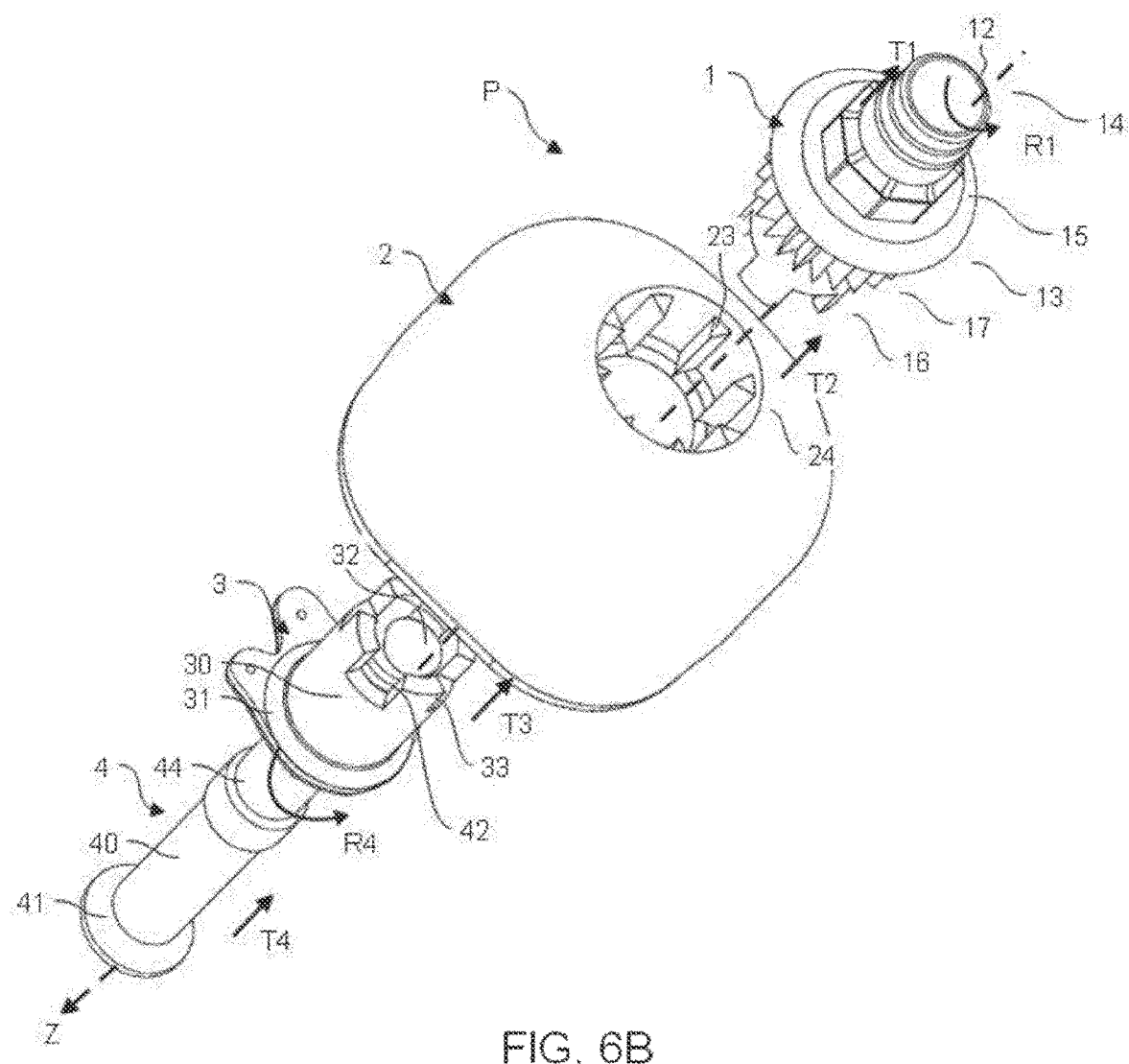
FIG. 6B are schematic perspective representations of the method for mounting the healing abutment according to the invention.

A method for mounting the healing abutment P according to the invention is described hereinafter, with reference to FIGS. 6A and 6B, which comprises four successive mounting steps detailed below.

In the first mounting step, the foot 1 is inserted into the implant housing by a translational movement T1 longitudinal relative to the axis Z and then the foot shank 14 is screwed into the implant housing by a rotational movement R1 about the axis Z until the connecting ring 15 is locked in the implant housing by positive fit. At the end of the first mounting step, the foot 1 is fixedly mounted into the implant housing.

Figure 7A:
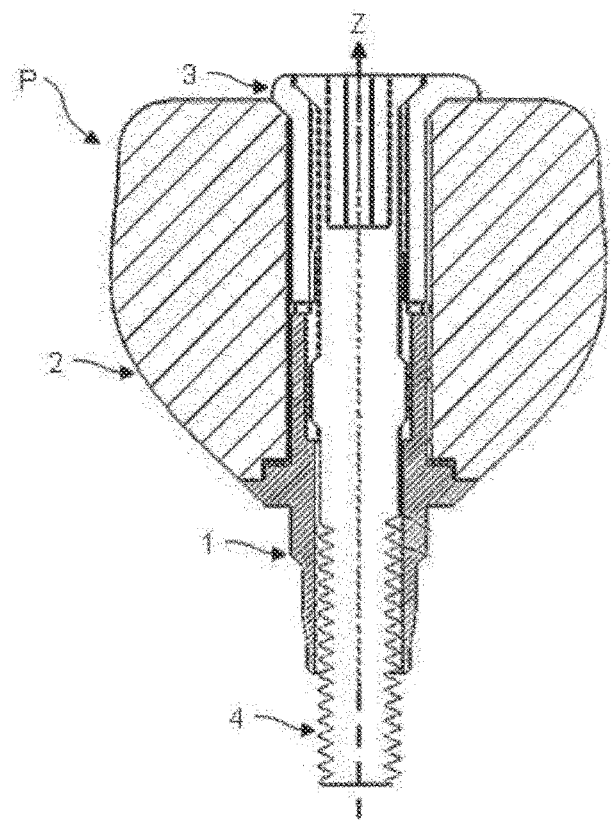
FIG. 7A and FIG. 7B are schematic representations in a longitudinal cross-section view of the healing abutment according to the invention in the mounted position, centered and off-center relative to the axis Z, respectively.

In the second mounting step, the head 2 is mounted onto the foot 1 by a translational movement T2 longitudinal relative to the axis Z until the first interlocking member 17 and the second interlocking member 24 cooperate and the head 12 is in contact with the crown 13 of the foot 1. The angular orientation between the head 2 and the foot 1 is precisely defined. At the end of the second mounting step, as illustrated in FIG. 7A, the head 2 is resting on the crown 13 and is fixedly mounted radially and tangentially relative to the axis Z onto the foot 1. The head 2, on the other hand, is mounted free in longitudinal translation along Z with respect to the foot 1.

Figure 7B:
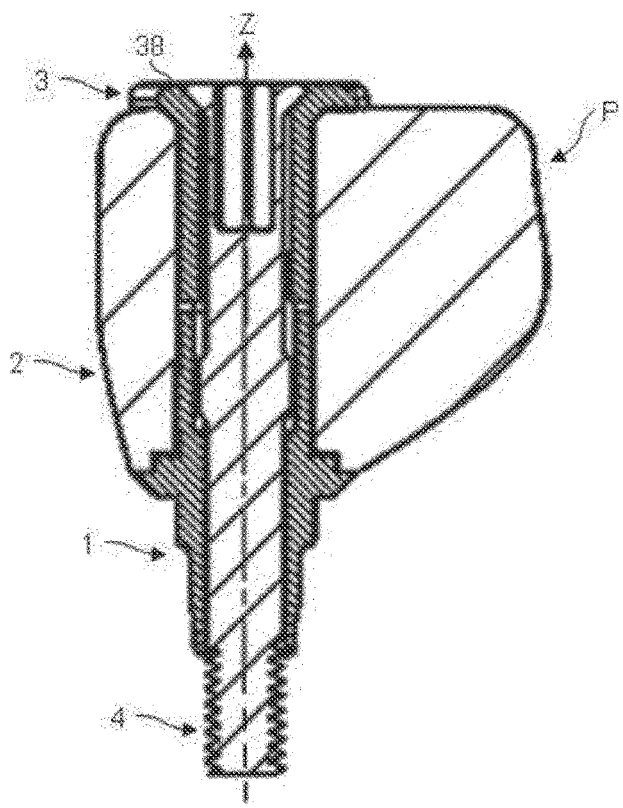

During the third mounting step, the reference member 3 is mounted onto the head 2 by inserting the body 30 into the head cavity 23 following a longitudinal translational movement T3 until the third interlocking member 16 of the foot 1 and the fourth interlocking member 33 of the reference member 3 cooperate. The orientation of the neck 31 defining the oriented reference frame is achieved prior to the translational movement T3 so that the reference member 3 does not extend protruding from the head 2 during an off-center mounting, as represented in FIG. 7B. In the example of FIG. 7B, the reduced portion 38 is thus angularly positioned where the upper head part 21 has the smallest radial length. At the end of the third mounting step, as illustrated in FIGS. 7A and 7B, the reference member 3 is fixedly mounted radially and tangentially relative to the axis Z onto the head 2 and mounted free in longitudinal translation along Z with respect to said head 2. The angular orientation between the reference member 3 and the foot 1 is precisely defined.

During the fourth mounting step, the clamping screw 4 is successively inserted into the reference cavity 32, the head cavity 23, the foot cavity 12 and the implant housing by a translational movement T4 longitudinal relative to the axis Z and then by a rotational movement R4 about the axis Z so as to screw the first shank portion 42 into the implant housing. The rotational movement R4 is stopped when the third shank portion 44 is resting on the crown 13. At the end of the fourth mounting step, as illustrated in FIGS. 7A and 7B, the clamping screw 4 locks the head 2 and the reference member 3 in the longitudinal direction relative to the axis Z. Furthermore, the clamping screw 4 is fixedly mounted into the implant housing.

By virtue of the healing abutment according to the invention previously described, healing of the gingiva takes place in a concave profile, so that once the prosthetic tooth is placed, the result is natural and esthetic. In addition, the healing abutment P does not need to be removed during impression taking, which avoids time-consuming and unpleasant manipulations for the patient and reduces the risk of peri-implantitis. Furthermore, the reference member 3 provides an oriented reference frame X, Y, Z readable by any scanner and the head 2 acts as a temporary prosthetic tooth, avoiding the addition of this part requiring further manipulations. By reading the reference frame defined by the reference member 3, the user determines the orientation of the foot 1 in a quick, direct and precise way, which allows the formation of a definitive tooth that can be perfectly positioned. Finally, this healing abutment P has the advantage of allowing precise angular positioning of the head 2 in the available space left by the missing tooth.

The invention claimed is:

1. A healing abutment configured to be mounted in an implant prior to placing a prosthetic tooth, the healing abutment comprising:
   a foot and a head which are aligned along an axis Z and connected by a clamping screw extending along the axis Z,
   the foot comprising a lower foot part configured to cooperate with the implant and an upper foot part,
   the head comprising a lower head part configured to cooperate with the upper foot part so as to mount the head onto the foot and an upper head part having a determined shape,
   at least one reference member defining an oriented reference frame in at least two dimensions and configured to cooperate with the foot in order to define a plurality of elemental positions of the oriented reference frame with respect to said foot along the axis Z, said at least one reference member being movably mounted as an insert onto the upper head part in order to allow at least one optimal elemental position to be selected among the plurality of elemental positions according to the determined shape of said upper head part; and
   wherein the oriented reference frame being defined on an upper face of the reference member.

2. The healing abutment according to claim 1, wherein the at least one reference member comprises at least one neck comprising at least one protruding portion extending radially relative to the axis, so as to define a reference frame.

3. The healing abutment according to claim 2, wherein the at least one protruding portion is at least one reference finger extending radially relative to the axis Z.

4. The healing abutment according to claim 1, wherein the at least one reference member comprises at least one neck comprising at least one recessed portion extending radially relative to the axis Z and comprising a reduced radial length of less than 3 mm.

5. The healing abutment according to claim 4, wherein the at least one recessed portion extends over an angular range about the axis Z greater than 90°.

6. The healing abutment according to claim 1, wherein the at least one reference member comprises a through cavity aligned along the axis Z, within which the clamping screw extends.

7. The healing abutment according to claim 1, wherein the upper foot part comprising at least one first interlocking member, the lower head part comprising at least one second interlocking member configured to cooperate with the at least one first interlocking member so as to mount the head onto the foot, the at least one first interlocking member comprising at least eight radial teeth relative to the axis Z and the at least one second interlocking member comprises at least eight radial notches configured to cooperate with the radial teeth to define a plurality of relative angular positions between the foot and the head relative to the axis Z.

8. The healing abutment according to claim 1, wherein the head comprises a through cavity aligned along the axis Z, within which the clamping screw extends.

9. A dental assembly comprising an implant and the healing abutment according to claim 1, the implant comprising an attachment end configured to be attached to a patient's maxillary bone, a gingival end configured to extend into the patient's gingiva, and an implant housing comprising a female thread, wherein the lower foot part of the healing abutment is mounted in the implant housing and the clamping screw of the healing abutment cooperates with the female thread of the implant housing.

10. The healing abutment according to claim 1, wherein the head of the healing abutment is in the form of a temporary prosthetic tooth.

11. A healing abutment configured to be mounted in an implant for use as a temporary prosthetic foot prior to placing a permanent prosthetic tooth, the healing abutment comprising:
   a foot and a head which are aligned along an axis Z and connected by a clamping screw extending along the axis Z;
      the foot comprising a lower foot part configured to cooperate with the implant and an upper foot part;
      the head comprising a lower head part configured to cooperate with the upper foot part so as to mount the head onto the foot and an upper head part having a determined shape with an exposed upper surface;
      wherein the foot and the head are interlocked from angular movement relative to one another by complementary interlocking members;
   a reference member defining an oriented reference frame in at least two dimensions and configured to cooperate with the foot to define a plurality of elemental positions of the oriented reference frame with respect to said foot along the axis Z, the reference member being movably mounted as an insert onto the upper head part to allow at least one optimal elemental position to be selected among the plurality of elemental positions according to the determined shape of said upper head part, and
   wherein the reference member is located on the upper head part and is visible at the upper surface of the upper head part.

12. The healing abutment according to claim 11, wherein the oriented reference frame is defined on an upper face of the reference member.

13. The healing abutment according to claim 11, wherein the reference member has a through cavity aligned along the axis Z, and at least two spaced apart reference fingers extending radially of the axis Z.

14. The healing abutment according to claim 11, wherein the complementary interlocking members is a first set of complementary interlocking members and further comprising a second set of complementary interlocking members to interlock the reference member and the foot from angular movement relative to one another.

15. The healing abutment according to claim 11, wherein the reference member comprises a neck comprising at least one protruding portion extending radially relative to the axis Z so as to define a reference frame.

16. The healing abutment according to claim 15, wherein the at least one protruding portion is at least one reference finger extending radially relative to the axis Z.

17. The healing abutment according to claim 11, wherein the reference member comprises a through cavity aligned along the axis Z, within which the clamping screw extends.

18. The healing abutment according to claim 11, wherein the head comprises a through cavity aligned along the axis Z, within which the clamping screw extends.

19. The healing abutment according to claim 11, wherein the head, the foot, the clamping screw, and the reference member are used during impression taking to define the shape and size of the prosthetic foot.

20. The healing abutment according to claim 11, wherein the reference member has a size and a shape, and wherein the reference member is usable on a head that is either of an incisor type or a canine type.

* * * * *